US009953058B1

(12) United States Patent
Sadri

(10) Patent No.: US 9,953,058 B1
(45) Date of Patent: Apr. 24, 2018

(54) SYSTEMS AND METHODS FOR SEARCHING LARGE DATA SETS

(71) Applicant: Levyx, Inc., Irvine, CA (US)

(72) Inventor: Mohammad Reza Sadri, Irvine, CA (US)

(73) Assignee: LEVYX, INC., Irvine, CA (US)

( * ) Notice: Subject to any disclaimer, the term of this patent is extended or adjusted under 35 U.S.C. 154(b) by 330 days.

(21) Appl. No.: 14/812,923

(22) Filed: Jul. 29, 2015

(51) Int. Cl.
*G06F 17/30* (2006.01)

(52) U.S. Cl.
CPC .. *G06F 17/30501* (2013.01); *G06F 17/30324* (2013.01); *G06F 17/30327* (2013.01); *G06F 17/30554* (2013.01); *G06F 17/30864* (2013.01)

(58) Field of Classification Search
CPC .................... G06F 17/30625; G06F 17/30619
See application file for complete search history.

(56) References Cited

U.S. PATENT DOCUMENTS 7,028,042 B2 4/2006 Rissanen
7,071,853 B2 7/2006 Price
7,310,055 B2 12/2007 Odagiri
7,580,429 B1 8/2009 Wallach
RE41,152 E 2/2010 Reynar et al.
7,705,753 B2 4/2010 Speirs, III et al.
7,965,841 B2 6/2011 Itani
7,973,680 B2 7/2011 Iyer et al.
8,156,156 B2 4/2012 Ferragina et al.
8,504,510 B2 8/2013 Bremler-Barr et al.
8,700,579 B2 4/2014 Apanowicz et al.
8,954,728 B1 2/2015 Juels et al.
2006/0288024 A1 12/2006 Braica
2009/0174583 A1 7/2009 Diaz-Gutierrez et al.
2011/0016097 A1 1/2011 Teerlink
2014/0149605 A1 5/2014 Annamalaisami et al.
2015/0032757 A1 1/2015 Barykin et al.

FOREIGN PATENT DOCUMENTS

WO 2013140530 9/2013

*Primary Examiner* — William Spieler
(74) *Attorney, Agent, or Firm* — Fish IP Law, LLC

(57) ABSTRACT

An improved search engine reorganizes an input database containing a set of values into a searchable tree structure having nodes of information with pointers to child nodes. The searchable tee structure is then converted into a searchable array structure that uses mathematical operations to rapidly traverse through elements of the array using mathematical formula to reach different memory locations instead of requiring pointer lookups.

20 Claims, 12 Drawing Sheets

| 010 | 111 | 010 | 010 | 111 | 011 | 010 | 010 | 010 | 010 | 010 | 010 |
|-----|-----|-----|-----|-----|-----|-----|-----|-----|-----|-----|-----|
| [ ] | G   | A   | R   | S   | L   | E   | R   | I   | T   | I   | P   | G |

| 010 | 111 | 010 | 010 | 111 | 011 | 010 | 010 | 010 | 010 | 010 | 010 |
|-----|-----|-----|-----|-----|-----|-----|-----|-----|-----|-----|-----|
| [ ] | G | A | R | S | L | E | R | I | T | I | P |

810 / 820

| 010 | 010 | 010 | 000 | 010 | 000 | 000 | 010 | 000 | 000 | 010 | 000 |
|-----|-----|-----|-----|-----|-----|-----|-----|-----|-----|-----|-----|
| O | D | O | [ ] | U | [ ] | N | N | [ ] | [ ] | Y | [ ] |

900

| 910 | Index | 0 | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|
| 920 | Bit | 0 | 1 | 0 | 1 | 1 | 1 | 0 | 1 | 0 | 0 | 1 | 0 | 1 | 1 | 1 | 0 | 1 | 1 | 0 | 1 | 0 |
| 930 | Char | [] | | | G | | | A | | | R | | | S | | | L | | | E | | |

| 911 | Index | 21 | 22 | 23 | 24 | 25 | 26 | 27 | 28 | 29 | 30 | 31 | 32 | 33 | 34 | 35 | 36 | 37 | 38 | 39 | 40 | 41 |
|---|---|---|---|---|---|---|---|---|---|---|---|---|---|---|---|---|---|---|---|---|---|---|
| 921 | Bit | 0 | 1 | 0 | 0 | 1 | 0 | 0 | 1 | 0 | 0 | 1 | 0 | 0 | 1 | 0 | 0 | 1 | 0 | 0 | 1 | 0 |
| 931 | Char | R | | | I | | | T | | | I | | | P | | | G | | | O | | |

| 912 | Index | 42 | 43 | 44 | 45 | 46 | 47 | 48 | 49 | 50 | 51 | 52 | 53 | 54 | 55 | 56 | 57 | 58 | 59 | 60 | 61 | 62 |
|---|---|---|---|---|---|---|---|---|---|---|---|---|---|---|---|---|---|---|---|---|---|---|
| 922 | Bit | 0 | 1 | 0 | 0 | 1 | 0 | 0 | 0 | 0 | 0 | 1 | 0 | 0 | 0 | 0 | 0 | 1 | 0 | 0 | 0 | 0 |
| 932 | Char | D | | | O | | | [] | | | U | | | [] | | | N | | | [] | | |

| 913 | Index | 63 | 64 | 65 | 66 | 67 | 68 | 69 | 70 | 71 | 72 | 73 | 74 | 75 | 76 | 77 | 78 | 79 | 80 | 81 | 82 | 83 |
|---|---|---|---|---|---|---|---|---|---|---|---|---|---|---|---|---|---|---|---|---|---|---|
| 923 | Bit | 0 | 1 | 0 | 0 | 0 | 0 | 0 | 0 | 0 | 0 | 1 | 0 | 0 | 0 | 0 | | | | | | |
| 933 | Char | N | | | [] | | | [] | | | Y | | | [] | | | | | | | | |

Figure 9

SYSTEMS AND METHODS FOR SEARCHING LARGE DATA SETS

FIELD OF THE INVENTION

The field of the invention is database compression.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The amount of information archived on computer storage is constantly increasing. Keeping track and sorting through that amount of information can be incredibly time-consuming for even the most advanced computer systems without systems and methods for optimizing search parameters in order to speed up searches.

U.S. Pat. No. 7,310,055 B2 to Odagiri teaches a system that classifies character strings into groups of character strings with the same leading n characters (e.g. “abc”). Odagiri finds the character string with the highest appearance frequency and extracts it from each group, and then registers that character string in a dictionary as initial values. While Odagiri’s system compresses the data, Odagiri’s system is not very fast, since each search through Odagiri’s compressed tree requires several hash table lookup commands.

US RE 041152 to Reynar teaches an adaptive compression technique that pre-fills compression dictionaries before the beginning of data compression with letter sequences, words and/or phrases that are frequent in the domain from which the data being compressed is drawn. The pre-filled dictionary could then be applied to Lempel-Ziv compression techniques in order to speed up compressing and searching. Reynar’s compression schema, however, requires the system to already have foreknowledge of the system to pre-fill the dictionary, and also requires multiple hash table lookup commands in order to search through the compressed structure.

U.S. Pat. No. 8,156,156 B2 to Ferragina et al. teaches a method of structuring and compressing labeled trees of an arbitrary degree and shape in order to optimize the size of the tree. Ferragina compresses a labeled tree into two coordinated arrays, one that captures the structure of the tree, and the other capturing the labels of the tree. Ferragina’s arrays, however, require one of the arrays to capture the entire root of a leaf within the array structure, which might increase the speed of searching, but is duplicative and does not compress well.

Thus, there remains a need for a system and method to improve the compression of resident databases to search through and the speed at which such databases are searched.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods in which a computer system is configured to compress a set of values into a compressed structure that can be easily held within resident memory. The compressed structure is preferably built out of a series of arrays that are directly indexed to memory locations that can be traversed through mathematical operations, instead of by looking up pointers in a hash table. The compressed structure is a novel structure constructed using the aid of how tree structures are mathematically related to one another. The computer system receives a set of values and stores the set of values in a memory location on the computer system. Sets of values are typically stored within a database system in an organized format, such as a SQL™ or Oracle™ file, or even a csv file. The system could import the sets of values, one by one, into a searchable k-ary tree. The results of a search are transmitted to a user interface for presenting to a user, for example by visually presenting the results on a display or by announcing the results through a speaker.

In some embodiments, the system could convert an existing database searching system into a compressed k-ary tree structure, thereby allowing searches to be performed faster. For example, the system could import the set of values from an existing database structure to create the k-ary tree structure. While the system could convert an entire database and replace the database with a k-ary tree structure, it is preferred that the system simply converts a subset of the database into the k-ary tree structure to optimize the database, instead of replacing an entire database. In some embodiments, the system could receive data from at least one existing user interface by importing data, such as a key field or value field, from at least one existing database structure, such as a DBMS structure, file system, NAS device, or a hash table. In other embodiments, the system could be configured to search the database and identify the most commonly accessed values, import the most commonly accessed values, converts the database memory into a compressed k-ary tree structure, and stores the database memory as a compressed array that is configured for rapid searching. This retrofitting process greatly expedites common searches of the existing database and enables faster cross-reference searches since it vastly improves searching of the most common values in a database.

As used herein, a k-ary tree is a tree structure with maximum k-number of branches per node, so a binary tree having at most 2 branches per node is considered a 2-ary tree, a ternary tree having at most 3 branches per node is considered a 3-ary tree, and so on. A “searchable k-ary tree” structure is a structure that holds values within the tree in a way that a system could search for one or more values stored in the tree in a systematic manner. Each node of the k-ary tree structure could comprise a k-bit that denotes branches of the node and a character of at least one of the values. Preferably, each node of the k-ary tree structure consists of a k-bit that denotes branches of the node and a character of at least one of the values. In some embodiments, a [null] character is considered a character of a value. For instance, a value of “hello” could have the characters [h]-[e]-[l]-[l]-[o]-[null]. Contemplated values include numerical values (e.g. binary, decimal, hexadecimal numbers) and string values of characters (e.g. numbers, alphanumeric characters, ASCII characters).

In some embodiments, a system inserts each value of the set of values into an empty k-ary tree structure one-by-one until the entire k-ary tree structure is fully populated with the set of values. For example, the system could insert the first value of the set of values as a straight linear branch of characters from a root of the k-ary tree. The system could then insert the next value of the set of values by comparing consecutive characters of the second value against consecutive characters of the straight linear branch, and then by branching off the straight linear branch where a character of the second value diverges from the straight linear branch. Each value could continue to be inserted into the k-ary tree structure in this manner until the entire set of values has populated the k-ary tree structure. Depending upon the set of values, the resulting k-ary tree structure might be unbalanced. In some embodiments, the set of values could be reordered before converting the set of values into the searchable k-ary tree structure in order to reduce an uneven balance to the k-ary tree structure.

Once the searchable k-ary tree structure has been constructed, the system preferably then converts the k-ary tree structure into a searchable array structure. Contemplated searchable array structures comprise at least two arrays—a k-bit array and a character array—where the first k-bit array comprises an array of k-bits from each node of the k-ary tree, and the second character array comprises an array of characters from each node of the k-ary tree. The first array and second array preferably correspond to one another, such that the first element of the first array and second array correspond to the same first node in the k-ary tree, the second element of the first array and second array correspond to the same second node in the k-ary tree, and so on. Preferably, the searchable array consists of the two arrays of k-bits and characters.

Converting the searchable k-ary tree structure into a searchable array structure could be done in a plurality of ways. Preferably, each node of the searchable k-ary tree structure is inserted into the array of k-bits and the array of characters according to a breadth first search algorithm. The searchable array structure is preferably stored in another memory location. While the searchable array structure could be stored in a transient, persistent memory location, the searchable array structure is preferably copied to a faster non-transient memory location, such as RAM, when in use so that rapid searching can be performed.

In some embodiments, the searchable array structure could be traversed by using the array of k-bits as an index to elements of the array. For example, the index could be traversed by recursively comparing a first character of the search string against consecutive test characters of the character array, selecting a k-bit element that corresponds to the result of the comparison, determining a number of antecedent set bits leading up to the selected k-bit, multiplying the number of antecedent set bits with the number k to obtain a product, and then selecting a character that corresponds with the product. For example, for each comparison, the system could evaluate whether the specific character of a searched string is greater than, less than, or equal to a specific character of a stored array (or searchable k-ary tree). In some embodiments, to generate a searchable k-ary tree, the system sets at least one bit of a k-bit array to indicate the presence of a branch from an existing node to a new node. This system allows the k-ary tree to be rapidly searched for branch nodes by indicating the existence of additional branches and/or nodes in a simple, easy-to-follow manner. For instance, in an embodiment with a ternary tree having a 3-bit array, setting the leftmost bit could indicate the presence of a left branch from the existing node to a new node on the left, setting the center bit could indicate the presence of a center branch from the existing node to a new node in the center, and setting the rightmost bit could indicate the presence of a right branch from the existing node to a new node. Thus, if the branch node has a 3-bit array designation of 010 (indicating an existing node with an existing branch in the center), a new designation of "110" would indicate the existence of a branch with a new node on the left; the designation "011" would indicate the existence of a branch with a new node on the right; and the designation "111" would indicate the existence of a branch with a new node on the left and a branch with a new node on the right.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

BRIEF DESCRIPTION OF THE DRAWING

FIG. 9 shows the arrays of FIG. 8 saved and indexed in a memory.

DETAILED DESCRIPTION

Figure 1:
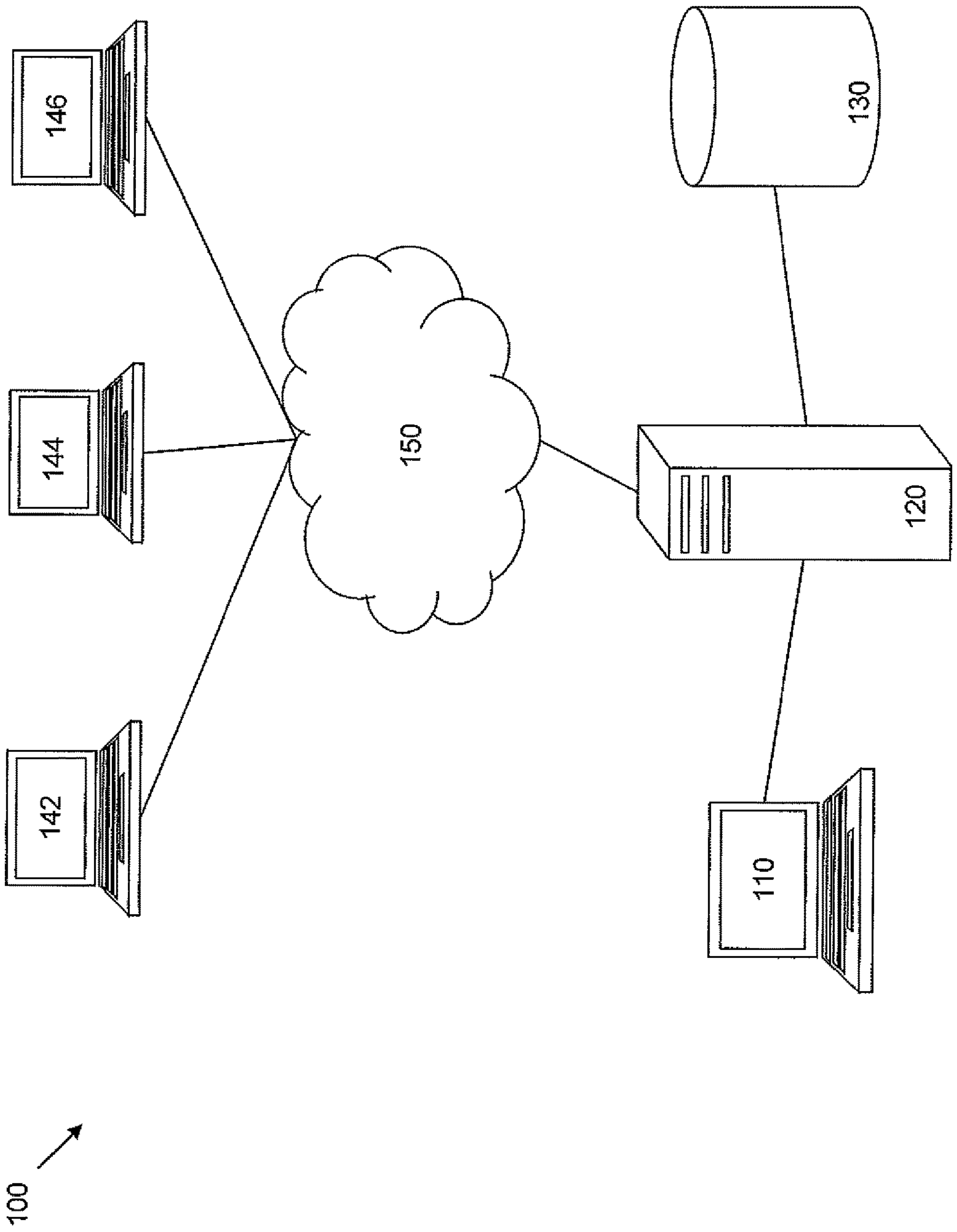
FIG. 1 shows a hardware schematic of a computer system configured to generate a compressed, searchable structure.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

One should appreciate that the disclosed techniques provide many advantageous technical effects including the ability to drastically speed up searching for values saved in memory by reorganizing how a set of values are saved in memory and are searched in memory.

The inventive subject matter provides apparatus, systems, and methods in which a computer system compresses a set of values into a compressed searchable structure that can be rapidly searched.

In FIG. 1, an embodiment of a contemplated hardware schematic 100 of a computer system configured to generate a compressed, searchable structure has an administrative user interface 110, a searchable computer system 120, and a non-transient computer readable memory 130. Searchable computer system 120 could be searched via network 150 by any number of client user interfaces 142, 144, and 146. While searchable computer system 120 is shown as a single computer system accessed by an administrative user interface 110 and accessing information saved on computer readable memory 130, it should be noted that any language directed to a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods.

While data exchanges with the administrative user interface 110 and computer readable memory 130 are shown as taking place along direct connections while data exchanges with the remote user interfaces 142, 144, and 146 are shown as taking place along an indirect connection through network 150, data exchanges could be conducted over any suitable packet-switched network, the Internet, LAN, WAN, VPN, or other type of packet switched network.

Administrative user interface 110 generally accesses searchable computer system 120 and configures searchable computer system 120 to generate a compressed searchable structure. The data used to generate the compressed searchable structure could be derived from any structure that holds sets of values, such as memory 130, which contains one or more databases holding one or more sets of values. Administrative user interface 110 could send a command to searchable computer system 120 to generate one or more compressed searchable structures that could be used to rapidly search for one of the values in a database of memory 130. The compressed searchable structure could be saved on memory 130, but is preferably small enough that it could be saved and accessed on local non-transient, RAM memory (not shown) on computer system 120.

Once a compressed, searchable structure is saved and could be accessed by searchable computer system 120, rapid searches of the compressed, searchable structure could be performed. In some embodiments, one or more queries could be submitted to searchable computer system 120 by any of client user interfaces 142, 144, and 146. A value could be rapidly searched by computer system 120, which could then be returned to any of computer systems 142, 144, and/or 146 as a result of the received query.

Figure 2:
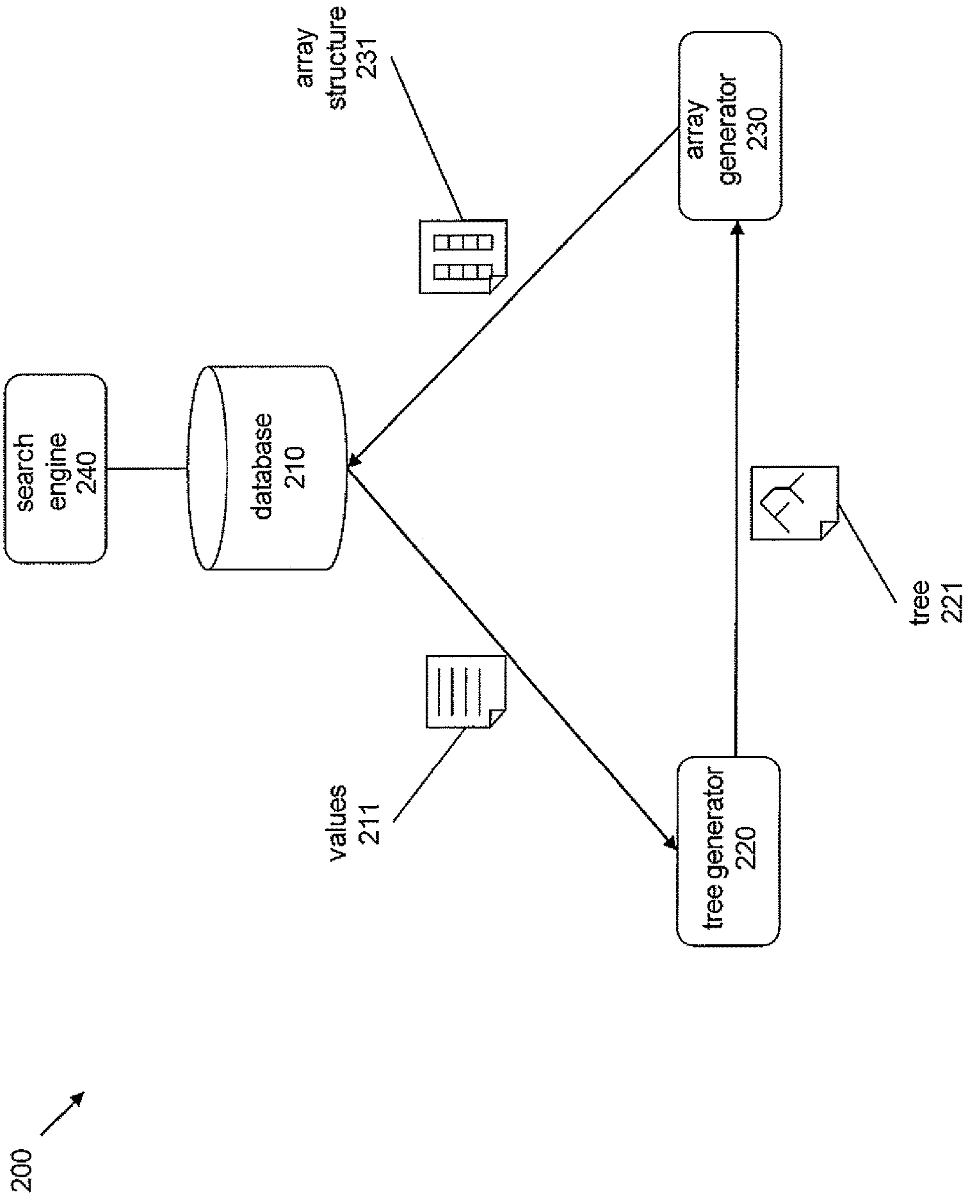
FIG. 2 shows a software schematic of a computer system configured to generate a compressed, searchable structure.

In FIG. 2, a software schematic 200 of a computer system configured to generate a compressed, searchable structure is shown having a search engine module 240 that accesses a database module 210 for information on various values. The computer system generally has a tree generator module 220 that receives values 211 from database 210 to generate a tree structure 221 of those received values. An array generator module 230 then receives that tree structure 221 of the received values and uses the tree structure to generate an array structure 231, which is then saved to database module 210. While database module 210 is shown as a single module that both provides sets of values (such as values 211)

to tree generator module 220 and also receives array structures (such as structure 231) from array generator module 230, the system could use separate modules for database 210, such as one database that holds uncompressed data on the sets of values and another database that holds compressed array structures of the values.

In some embodiments, database 210 comprises uncompressed databases, such as ORACLE™, SQL™, or even csv files. The computer system could pull one or more sets of values, such as values 211, from a table to create a compressed array structure 231, which could be rapidly searched to determine if one of the uncompressed databases holds a value. Compressed array structure 231 could act as an indexing engine that could be used as the underlying datastore module of the database system in order to increase the performance and speed of the database engine. For example, compressed array structure 231 could replace the innodb command in implementations of a mysql database system saved on database 210. As users submit queries to database 210 through search engine module 240, compressed array structure 231 could be used to rapidly and quickly determine what values are saved in the database system, and could be used to index such values.

In other embodiments, database 210 comprises a file system holding multiple files. Compressed array structure 231 could act as a data access and data placement layer for the file system to allow for rapid access of files within the file system. In other embodiments, database 210 could comprise save files for an application, such as a financial application, oil and gas application, or a workflow automation application. Such applications typically contain a large number of data files interspersed throughout a computer system's memory. Compressed array structure 231 could then act as the rapid data access layer of the application to rapidly access one or more data files. Where data is saved in a computer system, the data could be converted into a compressed array structure for rapid searching and indexing.

Figure 3:
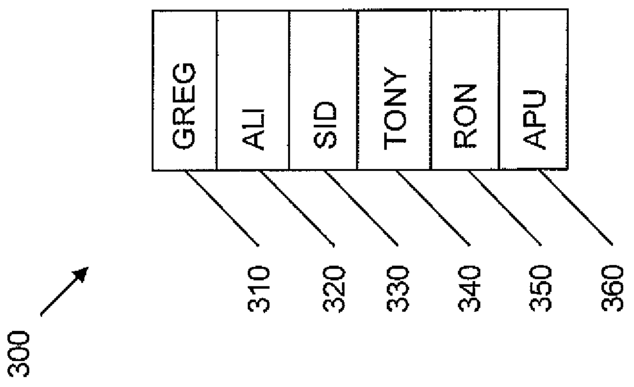
FIG. 3 shows a set of uncompressed values.

An example of an uncompressed set of data 300 is shown in FIG. 3. While set of data 300 is shown as only a single column of alphanumeric values, set of data 300 could comprise any type of value such as a series of binary values, decimal values, hexadecimal values, or ASCII values. Set of data 300 comprises six values of alphanumeric words: GREG 310, ALI 320, SID 330, TONY 340, RON 350, and APU 360. Contemplated systems could generate a tree structure from set of data 300 using an algorithm. The present examples use ternary tree structures as an example, but any k-bit tree structure could be used without departing from the scope of the invention.

Figure 4:
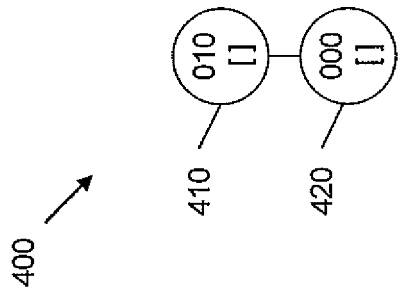
FIG. 4 shows an empty 3-bit tree structure.

FIG. 4 shows an exemplary empty ternary tree structure 400. Empty ternary tree structure 400 used as an example has a plurality of nodes, where each node has three elements: (1) a 3-bit set denoting the branch children of the node, (2) a character denoting the character saved in the node, and (3) pointers to any branch children. Empty tree 400 has a root node 410 with a 3-bit set "010," a null character denoted by "[ ]", and a single pointer to branch child node 420 and a child node 420 with a 3-bit set "000" and a null character denoted by "[ ]." Each 3-bit set denotes the number of branch children stemming off of the node. In the case of root node 410, the first bit 0 denotes that root node 410 does not have any left branch children, the second bit 1 denotes that root node 410 has a middle branch child, and the third bit 0 denotes that root node 410 does not have a right branch child. Child node 420's 3-bit set of "000" denotes that child node 420 does not have any branch children.

Figure 5A:
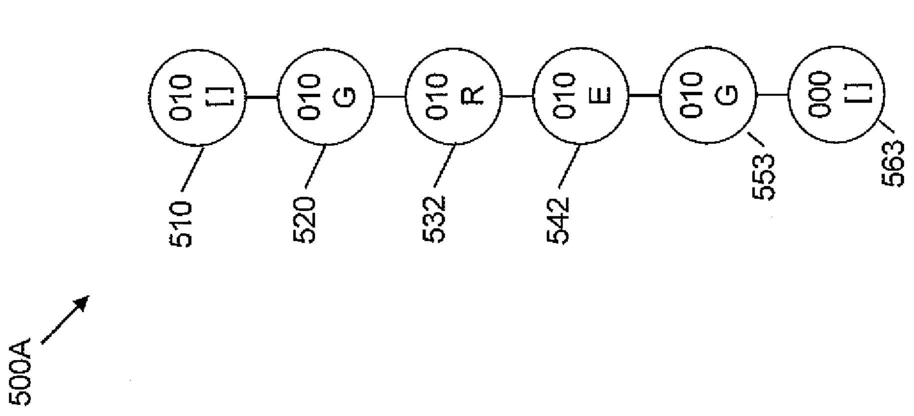
FIGS. 5A-F shows a step-by-step process of a 3-bit tree structure being populated with the set of values from FIG. 3.
Figure 5B:
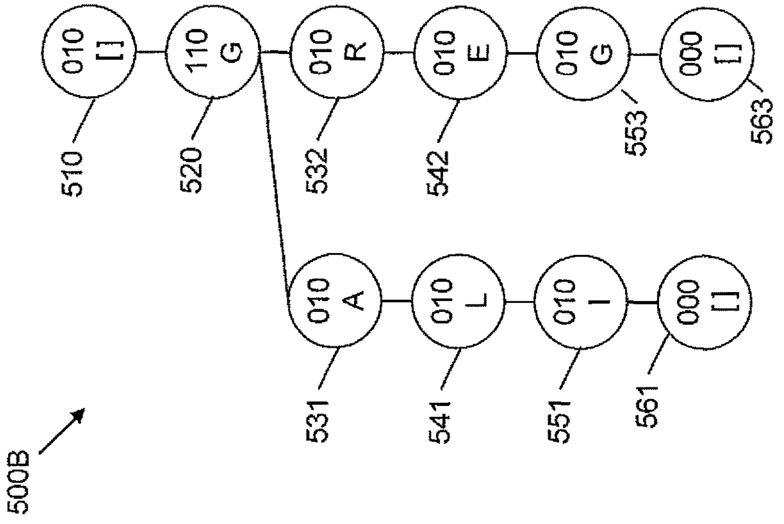
Figure 5C:
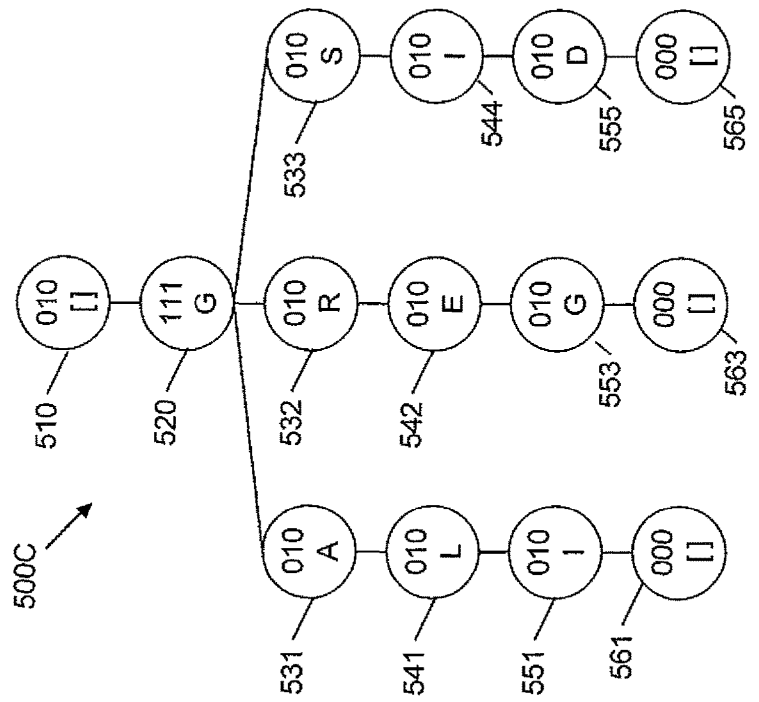
Figure 5E:
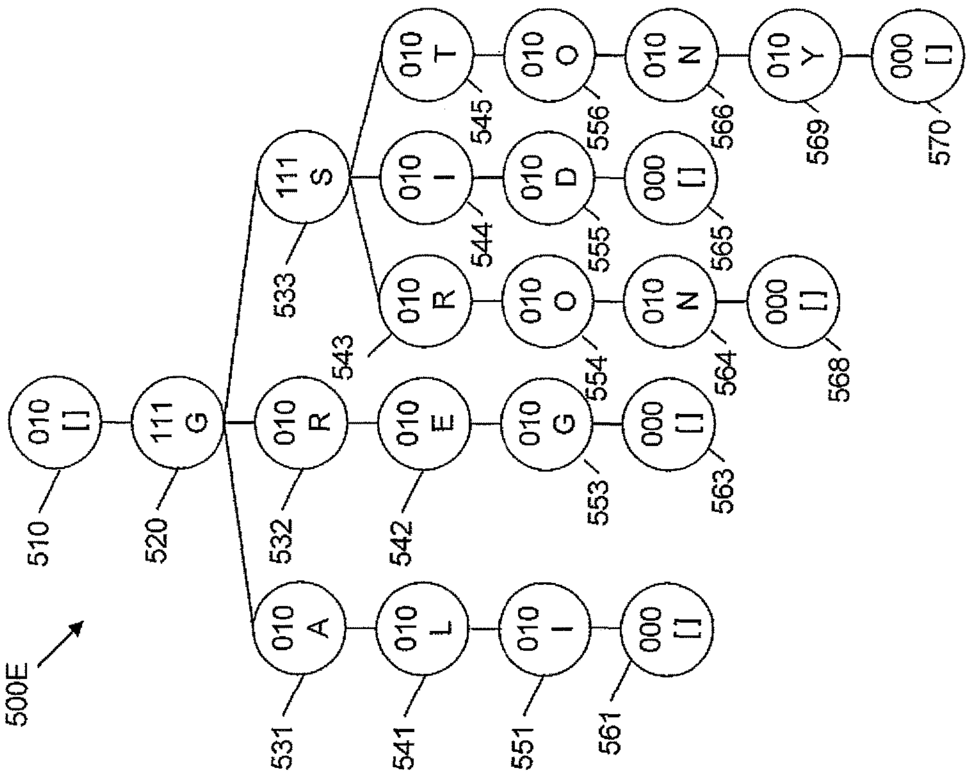
Figure 5D:
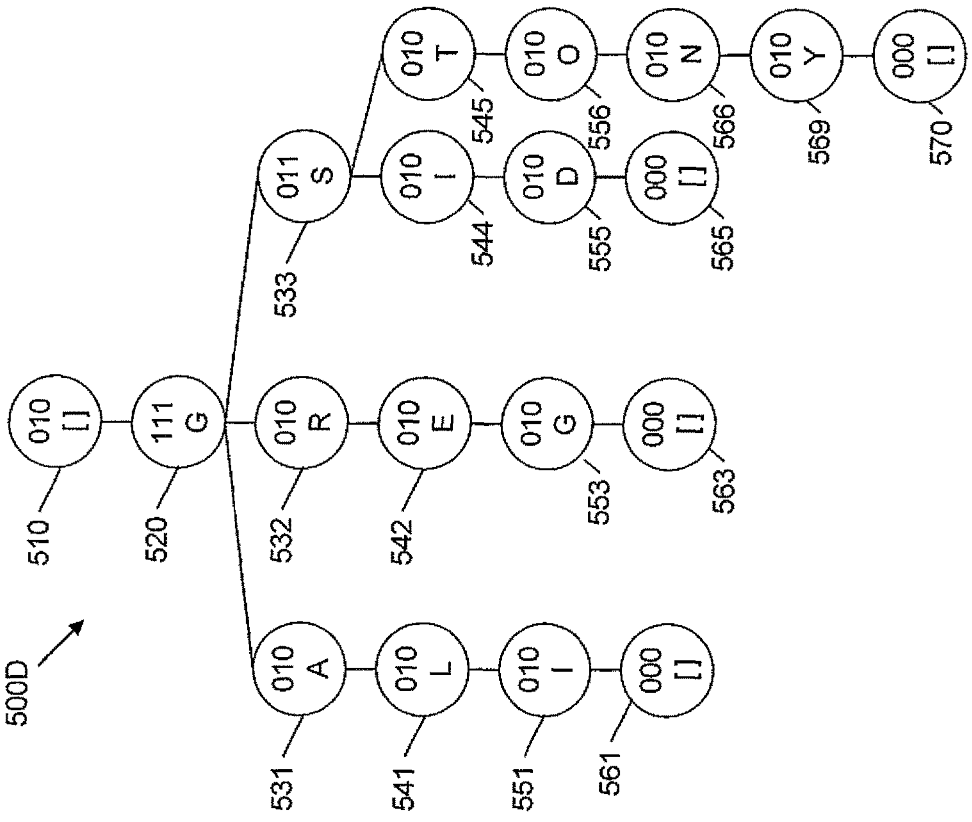
Figure 6:
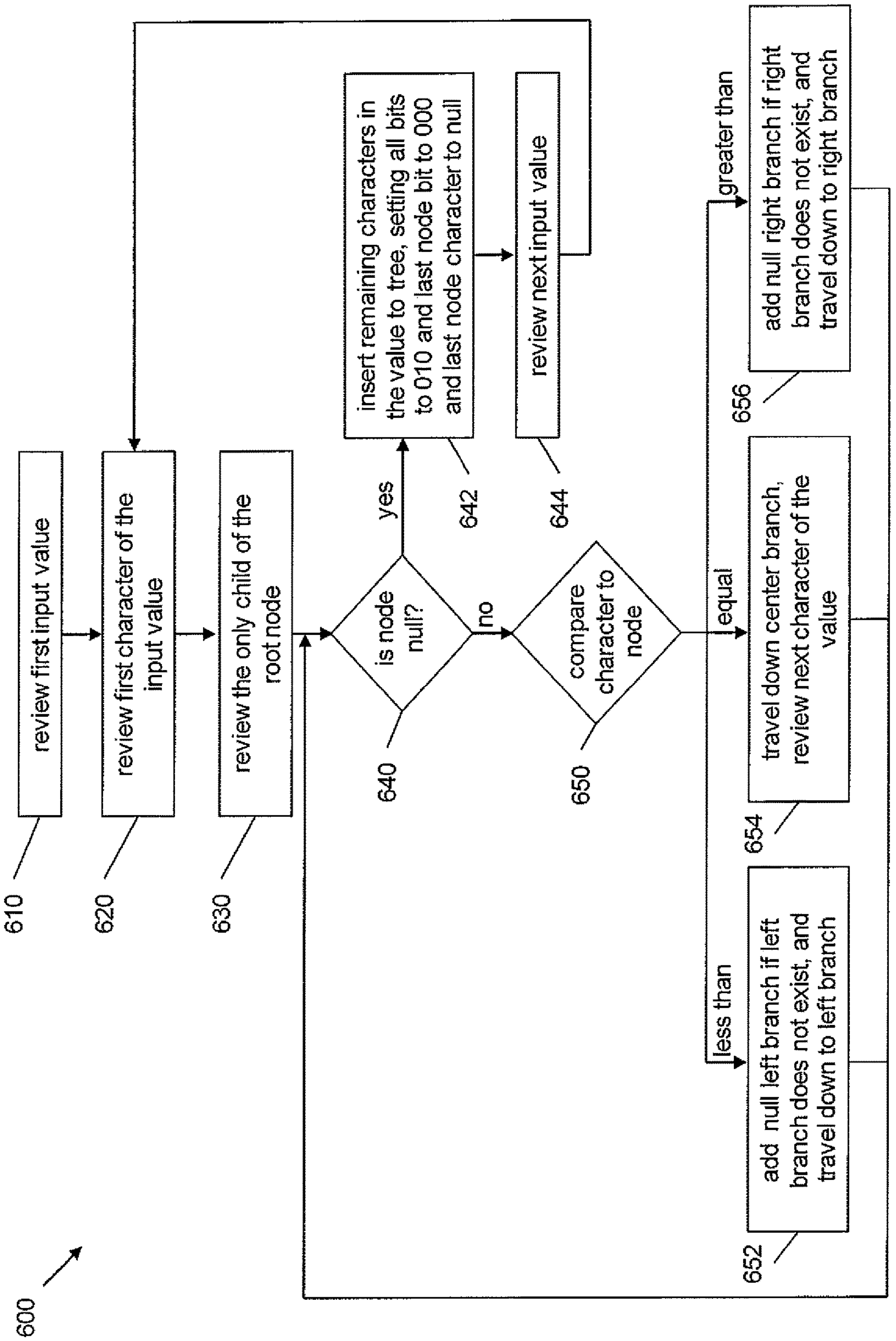
FIG. 6 shows a process used to generate the 3-bit tree structure of FIG. 5.

A populated ternary tree structure 500E shown in FIG. 5E could be gradually generated as shown in FIGS. 5A-5E by tree generator module 220 from set of data 300 by following the process 600 described in FIG. 6. To construct a tree structure in accordance with the steps shown in process 600, the computer system generally starts with an empty tree, such as empty tree 400 shown in FIG. 4. The computer system then first reviews the first input value in step 610. In the current example of set of data 300, the first input value is GREG 310. Next, the computer system reviews the first character of the first input value in step 620. In the current example of set of data 300, the first character of GREG 310 is the character "G." Next, the computer system reviews the only child of the root node, which is, in this case, child node 420 . . . a null node with a reset 3-bit of "000." Next, the computer checks to determine if the node is null in step 640. Since child node 420 is null, the system then inserts the remaining characters in the value GREG 310 to the tree, setting all bits to 010, the last node bit to 000, and last node character to null. As shown in FIG. 5A, the resulting structure is constructed by a computer system modifying root 510 to have a center branch pointer to new node 520, which has 3-bit structure "010" and character "G." New node 520 has a center branch pointer to new node 532, which has 3-bit structure "010" and character "R." New node 532 has center branch pointer to new node 542, which has 3-bit structure "010" and character "E." New node 542 has center branch pointer to new node 553, which has 3-bit structure "010" and character "G." New node 553 has a center branch pointer to new node 563, which is a null node.

After inserting all of the characters of the first value GREG 310, the system then reviews the next input value in step 644. In the current example set of data 300, the next input value is ALI 320. Next, the system executes step 620 to review the first character of ALI 320, which is "A," then executes step 630 to review the only child of the root node, and checks to determine if the child of the root node is null in step 640. The child of the root node 510 is now node 520, which is not null, so the system then proceeds to step 650 to compare the character "A" to the character in node 520. The character in node 520 is "G," and the comparison of "A" against "G" results in a determination that "A" is less than "G." The system then proceeds to step 652 to add a null left branch since no left branch exists, and then travels down to the left branch. The system again proceeds to step 640 to determine if this new left branch is a null node. Since the node is null, the system then proceeds to step 642 to insert the remaining characters of value ALI 320 to the tree, setting all bits to 010 and the last node to a null node. Inserting these characters results in tree 500B shown in FIG. 5B, with a new left branch added to node 520 that leads to new node 531. New node 531 starts the straight linear branch of nodes 531, 541, 551, and 561 which contain characters "A," "L," "I," and "[ ]," respectively.

After inserting all of the characters of the second value ALI 320, the system then reviews the next input value in step 644. In the current example set of data 300, the next input value is SID 330. Next, the system executes step 620 to review the first character of SID 330, which is "S," then executes step 630 to review the only child of the root node, and checks to determine if the child node 520 of the root node 510 is null in step 640. Node 520 is not null, so the system then proceeds to step 650 to compare the character "S" to the character in node 520. The character in node 520 is "G," and the comparison of "S" against "G" results in a determination that "S" is greater than "G." The system then proceeds to step 656 to add a null right branch since no right branch exists, and then travels down to the right branch. The system again proceeds to step 640 to determine if this new right branch is a null node. Since the node is null, the system then proceeds to step 642 to insert the remaining characters of SID 330 as a straight linear branch. This results in tree 500C, shown in FIG. 5C, which has node 520 now having a right branch pointer to node 533, which starts the straight linear branch of nodes 533, 544, 555, and 565 which contain characters "S," "I," "D," and "[ ]," respectively.

After inserting all of the characters of the third value SID 330, the system then reviews the next input value in step 644. In the current example set of data 300, the next input value is TONY 340. Next, the system executes step 620 to review the first character of TONY 340, which is "T," then executes step 630 to review the only child of the root node, and checks to determine if the child node 520 of the root node 510 is null in step 640. Node 520 is not null, so the system then proceeds to step 650 to compare the character "T" to the character in node 520. The character in node 520 is "G," and the comparison of "T" against "G" results in a determination that "T" is greater than "G." The system then proceeds to step 656 to travel down to the right branch (the system does not add a new null right branch since right branch already exists). The system again proceeds to step 640 to determine if this new right branch is a null node. Since the node is not null, the system then proceeds to step 650 to compare the character "T" to the character in node 533. The character in node 533 is "S," and the comparison of "T" against "S" results in a determination that "T" is greater than "S." The system then proceeds to step 656 to add a null right branch since no right branch exists, and then travels down to the right branch. The system again proceeds to step 640 to determine if this new right branch is a null node. Since the node is null, the system then proceeds to step 642 to insert the remaining characters of TONY 340 as a straight linear branch. This results in tree 500D, shown in FIG. 5D, which has node 533 now having a right branch pointer to node 545, which starts the straight linear branch of nodes 545, 556, 566, 569, and 570 which contain characters "T," "O," "N," "Y," and "[ ]," respectively.

After inserting all of the characters of the fourth value TONY 340, the system then reviews the next input value in step 644. In the current example set of data 300, the next input value is RON 350. Next, the system executes step 620 to review the first character of RON 350, which is "R," then executes step 630 to review the only child of the root node, and checks to determine if the child node 520 of the root node 510 is null in step 640. Node 520 is not null, so the system then proceeds to step 650 to compare the character "R" to the character in node 520. The character in node 520 is "G," and the comparison of "R" against "G" results in a determination that "R" is greater than "G." The system then proceeds to step 656 to travel down to the right branch. The system again proceeds to step 640 to determine if this right branch is a null node. Since the node is not null, the system then proceeds to step 650 to compare the character "R" to the character in node 533. The character in node 533 is "S," and the comparison of "R" against "S" results in a determination that "R" is less than "S." The system then proceeds to step 652 to add a null left branch since no left branch exists, and then travels down to the left branch. The system again proceeds to step 640 to determine if this new left branch is a null node. Since the node is null, the system then proceeds to step 642 to insert the remaining characters of RON 350 as a straight linear branch. This results in tree 500E, shown in FIG. 5E, which has node 533 now having a left branch pointer to node 543, which starts the straight linear branch of nodes 543, 554, 564, and 568 which contain characters "R," "O," "N," and "[ ]," respectively.

Figure 5F:
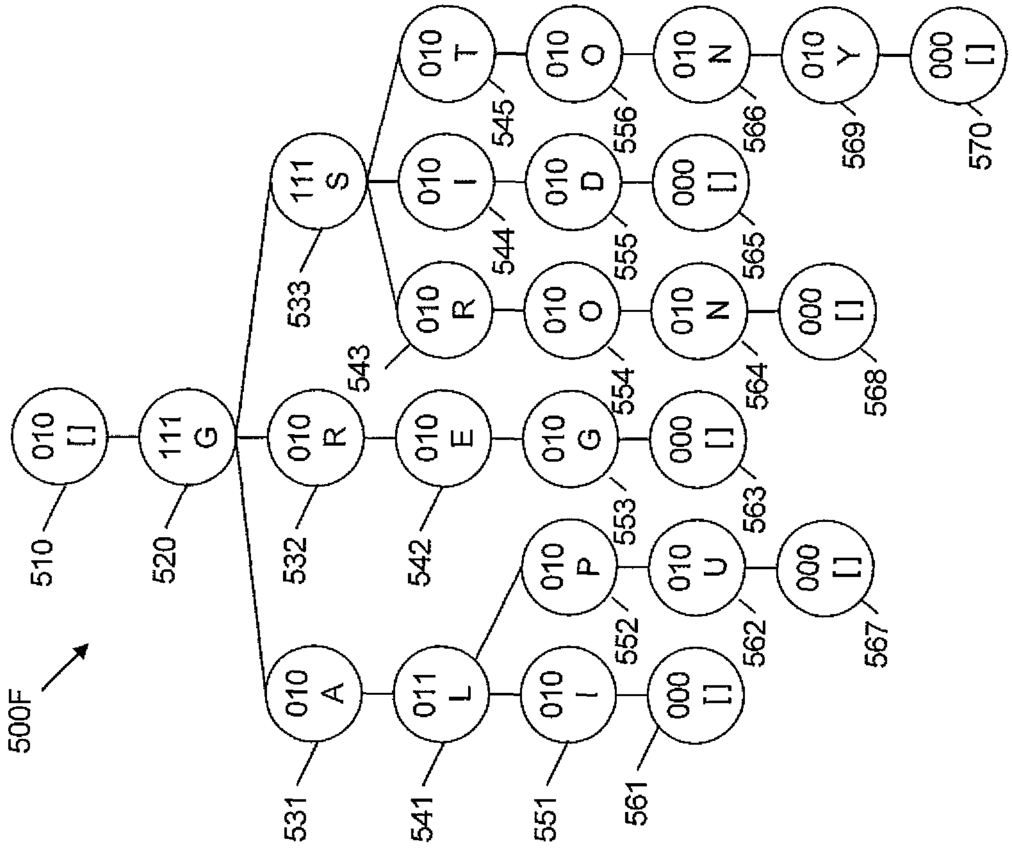

After inserting all of the characters of the fifth value RON 350, the system then reviews the next input value in step 644. In the current example set of data 300, the next input value is APU 360. Next, the system executes step 620 to review the first character of APU 360, which is "A," then executes step 630 to review the only child of the root node, and checks to determine if the child node 520 of the root node 510 is null in step 640. Node 520 is not null, so the system then proceeds to step 650 to compare the character "A" to the character in node 520. The character in node 520 is "G," and the comparison of "A" against "G" results in a determination that "A" is less than "G." The system then proceeds to step 652 to travel down to the left branch node 531. The system again proceeds to step 640 to determine if this left branch is a null node. Since the node is not null, the system then proceeds to step 650 to compare the character "A" to the character in node 531. The character in node 531 is "A," and the comparison of "A" in the first character of APU 360 against "A" in node 531 results in a determination that "A" is equal to "A." The system then proceeds to step 654 to travel down the center branch to node 541 and review the next character of the value APU 360. The second character of value APU 360 is "P." The system again proceeds to step 640 to determine if this node 541 is a null node. Since the node is not null, the system then proceeds to step 650 to compare the character "P" to the character in node 541. The character in node 541 is "L," and the comparison of "P" in the second character of APU 360 against "L" in node 541 results in a determination that "P" is greater than "L." The system then proceeds to step 656 and adds a null right branch node and travels down to the right branch node. The system then proceeds to step 640 to determine if the new right branch node is null. Since it is, the system then proceeds to step 642 to insert the remaining characters of value APU 360 as a linear branch of the tree, resulting in tree 500F shown in FIG. 5F. Tree 500F now has new nodes 552, 562, and 567, which contain characters "P," "U," and "[ ]," respectively.

While populating tree 500F in this manner is rather quick, a person of ordinary skill in the art could understand that certain orders of values might result in an unbalanced tree. For example, if the first value to be inserted into the tree was "ALI" instead of "GREG," the tree would be balanced rather heavily to the right. In some embodiments, the system could be configured to reorder the characters to improve the tree's balance. For example, the system could be configured to calculate the mean value ofthe first character of all of the values, and move a value having the mean value as the first value.

The disclosed embodiment of a populated tree 500F shows each vertical branch terminating with a special sentinel value to denote the end of a string, for example the H null character. However, other sentinels could be envisioned, such as an additional bit for each end node, which is set to indicate that the node marks the end of a string, and a reset bit to indicate that the node does not mark the end of a string. For populated tree 500F, node 564, for example, would have a set bit and node 554 would have a reset bit, eliminating the need for a null node 568. This also allows k-ary trees to hold values other than strings, such as blocks of byes or bits instead of strings. In other embodiments, each node could have appended characters at the end of each string, for example a set of numbers indicating a memory location. In this manner, populated tree 500F could act as a hash table for unique values, and when a user looks up a value GREG, the branches below GREG could reflect the memory location associated with that string of characters. By using such appended strings of characters (e.g. alphanumeric, decimal, hexadecimal, binary), the system could create hash tables in a k-ary tree format.

Figure 7:
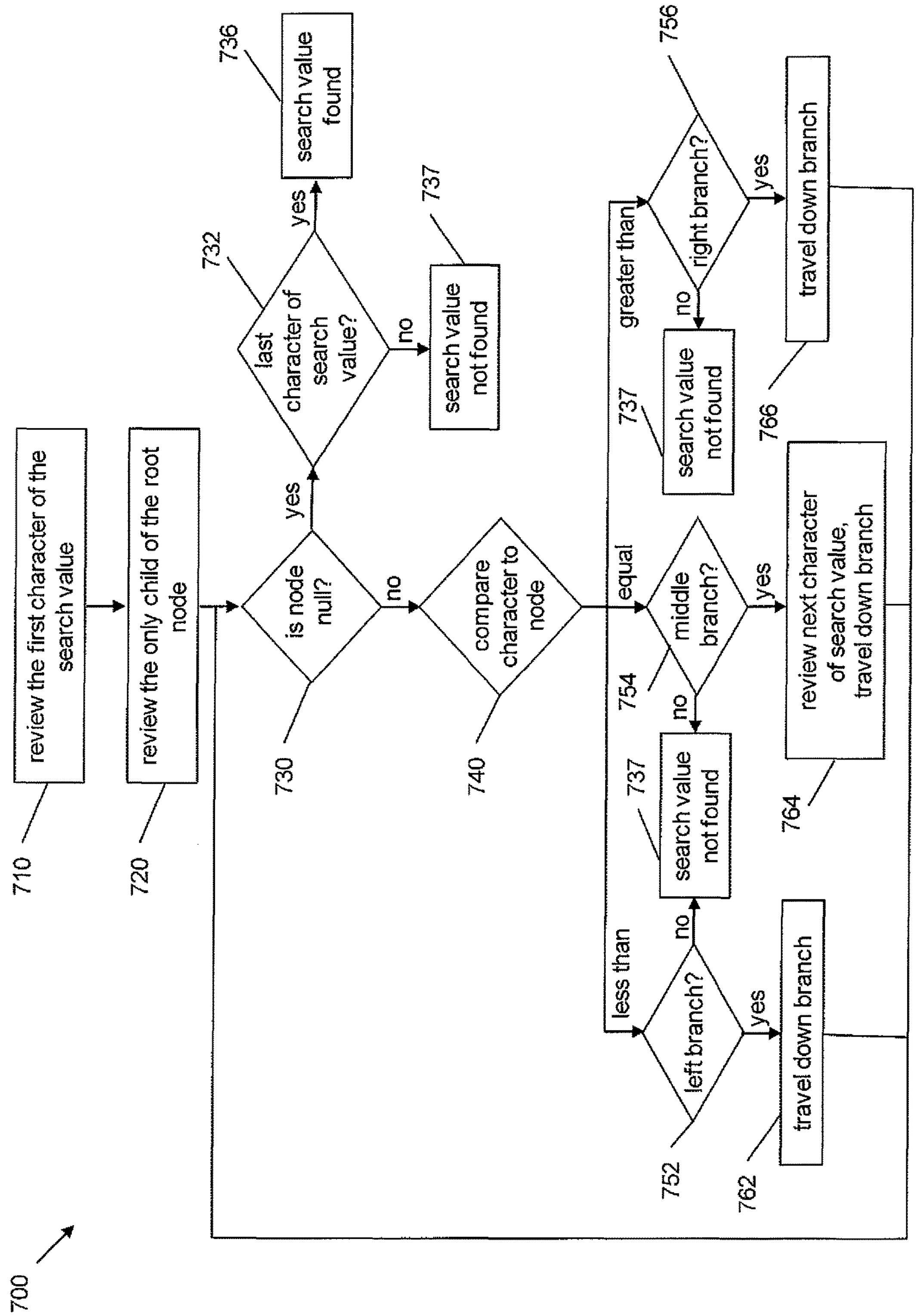
FIG. 7 shows a process used to search for a value stored in the 3-bit tree structure of FIG. 5.

Populated tree 500F could be traversed in order to determine if a search value is in the tree structure in a variety of ways. One way to search populated tree 500F would be to perform a breadth-first-search of the tree similar to process 700 shown in FIG. 7. For example, if a user were to search for the term GRAN (typically search terms include a null character [ ] or [null] at the end of the search term), the system would first proceed to step 710 to review the first character of the search value. The first character of the search value GRAN would be "G." The system would next proceed to step 720 to review the only child of the root node-node 520. The system then proceeds to step 730 to check if node 520 is null. Since node 520 is not null, the system would proceed to step 740 to compare the search character "G" against the character of node 520, which is "G." The result of this comparison is that the characters are equal to one another, which causes the system to proceed to step 754, which checks to see if node 520 has a middle branch child. Since node 520 has middle branch child 532, the system proceeds to step 764 to review the next character of the search value, which is "R," and travels down the center branch to the next node 532.

The system then proceeds to step 730 to check if node 532 is null. Since node 532 is not null, the system then proceeds to step 740 to compare the character "R" to the character in node 532, which is R". The result of this comparison is that the characters are equal to one another, which causes the system to proceed to step 754, which checks to see if node 532 has a middle branch child. Since node 532 has middle branch child 542, the system proceeds to step 764 to review the next character of the search value, which is "A," and travels down the center branch to the next node 542. The system then proceeds to step 730 to check if node 532 is null. Since node 532 is not null, the system then proceeds to step 740 to compare the character "A" to the character in node 542, which is "E". The result of this comparison is that "A" is less than "E," so the system proceeds to step 752 to check if node 542 has a left branch. Since node 752 does not have a left branch, the system then proceeds to step 737 to inform other modules that the search value GRAN has not been found in tree structure 500F.

While the search of populated tree 500F does not take very much time by itself, repeated searches could take quite a long time, especially if the system is required to travel down many branches of the tree before arriving at a determination. This is because a search of populated tree 500F requires the system to traverse each branch pointer and look up what node each branch is pointing to next. These repeated pointer look-ups can be time-consuming, especially when the system is forced to look up each tree branch separately as the system traverses each character of the search term.

Figure 8:
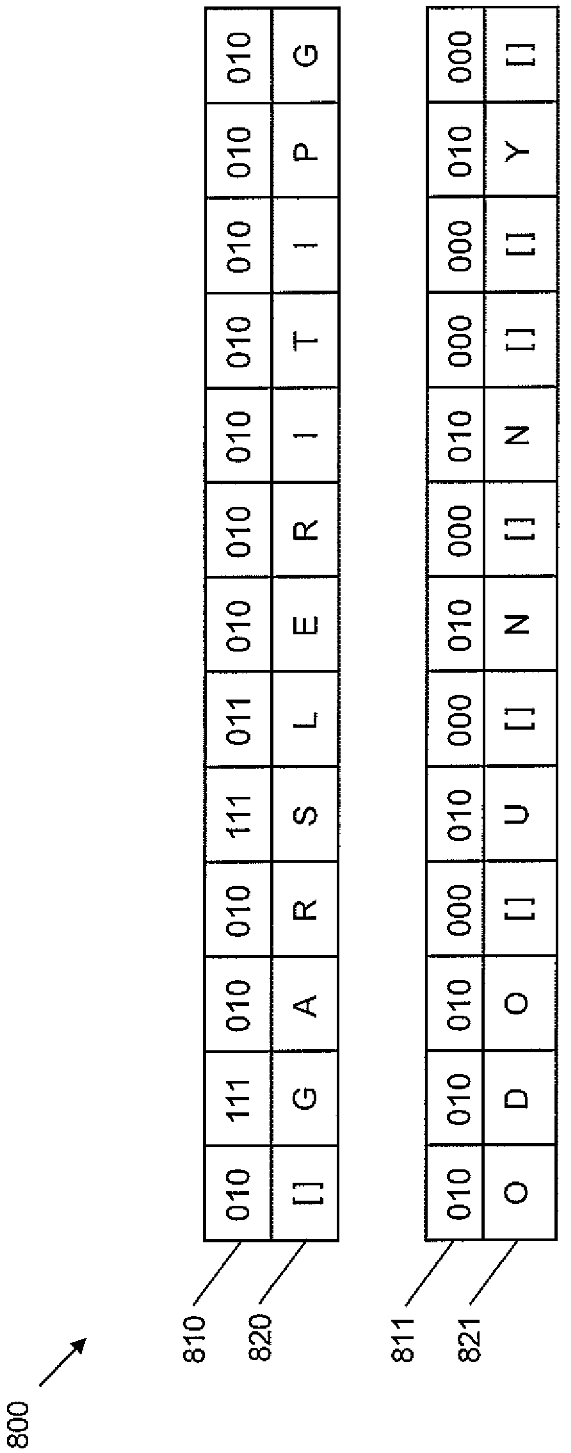
FIG. 8 shows a 3-bit array and character array converted from the 3-bit tree structure of FIG. 5.

The current system improves upon a search of tree 500F by building a series of arrays that are directly indexed to memory locations that can be computed by the system through mathematical operations, instead of by looking values up in a hash table. Such arrays are referred to herein as compressed, searchable structures or compressed, searchable arrays. In a preferred embodiment, the system first exports the contents of each node into two separate arrays following a breadth-first-search algorithm. A dual array 800 of exported arrays shown in FIG. 8, which shows an exported array of k-bits 810 (the 3-bit values from each node of tree 500F) and an exported array of character values 820. Array 811 is a continuation of array 810 and array 821 is a continuation of array 820. As shown, the k-bits and the character values directly correspond to one another, such that the k-bit above each character corresponds to the same node. Root node 510 has been sported as element[0] in dual array 800, child node 520 has been exported as element[1] of dual array 800, and so on and so forth from left to right in tree 500F in accordance with a breadth first search algorithm.

Next, the system could save and directly index the arrays to memory locations, as shown in indexed array 900 in FIG. 9. Indexed array 900 has index 910 running from 0 to 83, bit array 920 representing each of the bits in array 810, and character array 830 representing each of the characters in array 820. Arrays 911, 912, and 913, respectively, are continuations of array 910, arrays 921, 922, and 923, respectively, are continuations of array 920, and arrays 931, 932, and 933 are continuations, respectively, of array 930. Since each node has three bits and only one character, the character array has been spaced out such that each character is associated with an element with a multiple of 3, as shown. Elements that are not a multiple of 3 do not have associated characters.

Indexed array 900 can be searched very rapidly since no pointers, hash tables, or other indirect memory lookup functions are necessary in order to search indexed array 900 for a value. Each bit of bit array 920 is referred to herein as B[x], such that the first bit is B[0], the second bit is B[1], and so on. Each character of character array 930 is referred to herein as C[x], such that the first character is C[0], the second character is C[G], and so on and so forth.

In preferred embodiments the system could save character array 930 as a streamlined character array that lacks the empty spaces shown in FIG. 9, such that C[0] is "[ ]," C[1] is "G," C[2] is "A," and so on. In such embodiments, the system could alter the array number by a factor of three to refer to elements in the streamlined array (called streamline array S). For example, where the system might want to examine element C[21], which is the character R in character array 931, the system would simply look at element S[21/3], or S[7] in the streamlined array, which would be the same as element C[21] in compressed searchable structure 900.

In some embodiments, an index starting at "0" might not always be available. However, the same results could be used by performing a subtraction of the starting value of the index prior to performing operations. For example, where an index I starts at memory location 1934, I[1934] would be the same as B[0], I[1935] would be the same as B[1], and so on. If the system were to look for B[5], then the system would simply look for I[5+1934], which would be element I[1939] in the computer index.

Figure 10:
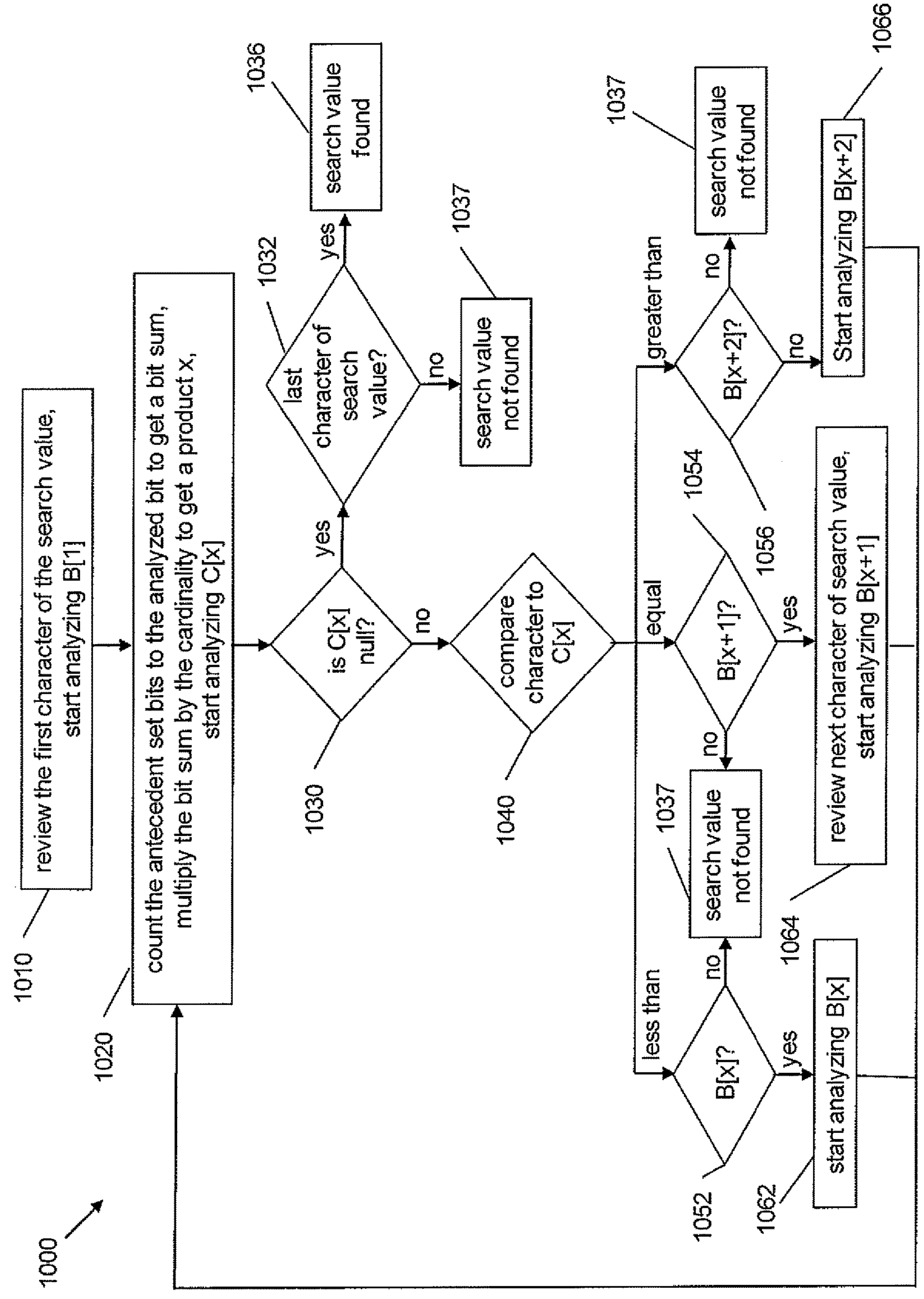
FIG. 10 shows a process used to search for a value saved in the arrays of FIG. 9.

A rapid manner in which to search through indexed array 900 is shown as process 1000 in FIG. 10. Let's say the computer system is searching for the value APU in indexed array 900. The system would first proceed to step 1010 to review the first character of the search value (the first character of APU is "A") and will start analyzing bit B[1]. In step 1020, the system will count the antecedent set bits to the analyzed bit to get a bit sum. The number of bits that are set up to bit B[1] is 1, so the sum is 1. Next, in step 1020, the system multiplies the bit sum (1) by the cardinality (a ternary tree has a cardinality of 3) to get a product (1×3 equals 3). Next, still in step 1020, the system will start analyzing character C[3]. In step 1030, the system determines whether character C[3] is null. According to array

900, C[3] is “G,” which is not null. So the system proceeds to step 1040, in order to compare the character “A” against C[3] which is “G.” A comparison of “A” against “G” shows that “A” is less than “G,” bringing the system to step 1052, to check if bit B[3] is set. Since B[3] is set, the system then starts analyzing B[3] as the new bit in step 1062, and again proceeds to step 1020, this time analyzing B[3].

In step 1020, the system counts the number of antecedent set bits to the analyzed bit B[3] to get a bit sum of 2 antecedent bits leading up to and including B[3]. Next, the system multiplies the bit sum 2 by the cardinality 3 to get the product 6, and starts analyzing C[6]. A person of ordinary skill in the art would note that this traverses to the next node without using a pointer lookup. Next, in step 1030, the system determines if character C[6] is null Character C[6] is the character “A,” and is not null, so the system then proceeds to step 1040 to compare the character “A” in APU against character C[6] which is “A.” This comparison results in an equal result, bringing the system to step 1054 to determine if bit C[6+1] is set. Since bit C[7] is set, the system proceeds to step 1064 to review the next character of the search value (the character “P” is the next character in the search value APU), and start analyzing B[6+1] which is B[7] and proceeds to step 1020.

In step 1020, the system counts the number of antecedent bits to the analyzed bit B[7] to get a bit sum of 5 antecedent bits leading up to and including B[7]. Next, the system multiplies the bit sum 5 by the cardinality 3 to get the product 15, and starts analyzing C[15]. Again, this traverses to the next node without using a pointer lookup. Next, in step 1030, the system determines if character C[15] is null. C[15] is the character “L” and is not null, so the system then proceeds to step 1040 to compare the character “P” in APU against character C[15] which is “L.” Since “P” is greater than “L,” the system then proceeds to step 1056, and checks if B[15+2] is set. Since B[17] is set, the system proceeds to step 1066 to start analyzing B[17] before proceeding to step 1020.

In step 1020, the system counts the number of antecedent bits to the analyzed bit B[17] to get a bit sum of 11 antecedent bits leading up to and including B[17]. Next, the system multiplies the bit sum 11 by the cardinality 3 to get the product 33, and starts analyzing C[33]. Again, this traverses to the next node without using a pointer lookup. Next, in step 1030, the system determines if character C[33] is null. C[33] is the character “P” and is not null, so the system then proceeds to step 1040 to compare the character “P” in APU against character C[33] which is “P.” Since “P” is equal to “P,” the system then proceeds to step 1054 to check if B[33+1] is set. Since B[34] is set, the system proceeds to step 1064 to review the next character of the search value (the next character of APU is “U”), and then start analyzing bit B[33+1], which is bit 34. The system then proceeds to step 1020.

In step 1020, the system counts the number of antecedent bits to the analyzed bit B[34] to get a bit sum of 17 antecedent bits leading up to and including B[34]. Next, the system multiplies the bit sum 17 by the cardinality 3 to get the product 51, and starts analyzing C[51]. Again, this traverses to the next node without using a pointer lookup. Next, in step 1030, the system determines if character C[51] is null. C[51] is the character “U” and is not null, so the system then proceeds to step 1040 to compare the character “U” in APU against character C[51] which is “U.” Since the character “U” in APU is equal to the character “U” in C[51], the system proceeds to step 1054 to check if B[51+1] is set. Since B[52] is set, the system then proceeds to step 1064 to review the next character of the search value (the next character of APU is “[ ]”), and then start analyzing bit B[51+1], which is bit 52. The system then proceeds to step 1020.

In step 1020, the system counts the number of antecedent bits to the analyzed bit B[52] to get a bit sum of 22 antecedent bits leading up to and including B[52]. Next, the system multiplies the bit sum 22 by the cardinality 3 to get the product 66, and starts analyzing C[66]. Again, this traverses to the next node without using a pointer lookup. Next, in step 1030, the system determines if character C[66] is null. Since the character C[66] is null, the system then proceeds to step 1032 to check if the system is analyzing the last character of the search value. Since the system is currently analyzing the last character of the search value, the system proceeds to step 1036 to indicate to the calling entity that the search value APU has been found in the compressed, searchable structure 900.

In some embodiments, the tree structure, and thus the compressed searchable array, could have one or more sets of characters appended to the value, to allow the system to return more than just a “value is found” or “value is not found.” In such an embodiment, after the system has verified that the null character is the last character of the search value in step 1032, the system could then proceed to travel down the center branches to retrieve the appended set of characters, and return the appended set of characters in addition to the “search value not found” result.

Figure 11:
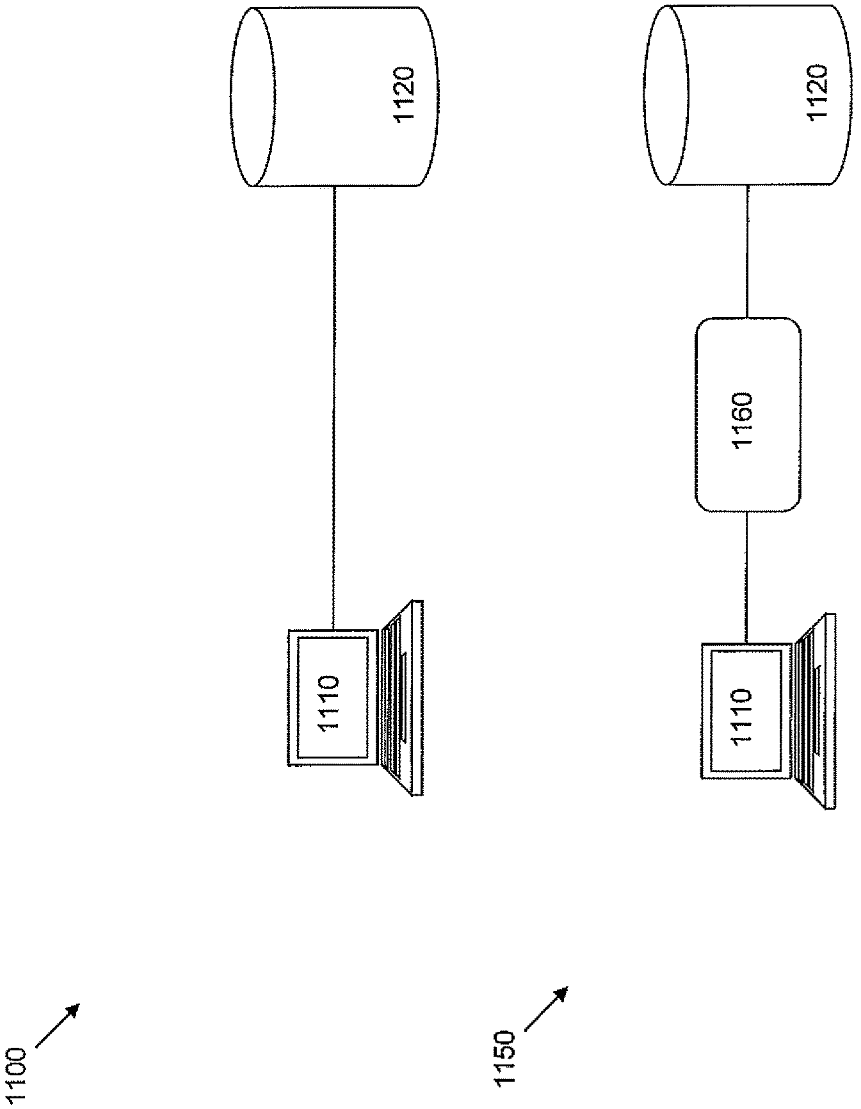
FIG. 11 shows a hardware schematic ofa computer system that adds a search optimizing module to an existing system.

FIG. 11 shows an embodiment of a contemplated software schematics 1100 and 1150 of two computer systems. Software schematic 1100 shows an existing user interface 1110 and existing searchable database 1120 represent an embodiment of a contemplated hardware schematic in which database memory is accessed using existing searching methods. For example, a search terminal coupled to an Oracle™ database. Existing administrative user interface 1110 could be, for example, a search terminal and existing database 1120 could be an Oracle™ database. Existing databases typically use hash tables and other such optimization methods to quickly search for data within the databases. Use of such memory lookup techniques, however, take time, even using computer systems that can perform hundreds or even thousands of memory lookup operations per second.

Software schematic 1150 shows the existing user interface 1110 coupled with database 1120 via compressed search module 1160, which comprises one or more computer systems, to enable data from database 1120 to be imported and then transposed into a rapidly searchable k-ary tree structure stored in compressed search module 1160. While the entirety of database 1120 could be imported into search module 1160 for rapid searching, it is preferred that search module 1160 imports only a subset of database 1120. For example, search module 1160 could be configured to search for the most commonly accessed fields in database 1120—such as specific tables, key fields, or key values—and import a subset of those fields into one or more compressed array structures in order to expedite common, or popular, searches. In other embodiments, search module 1160 could act as a gatekeeper to prevent useless searches from threshing database 1120. For example, search module 1160 could be configured to have a compressed searchable array holding a value for every non-duplicative value found in database 1120. When a command is then sent to database 1120, the system could first search for elements of that command, and if one of the elements is not found in the compressed, searchable array, the system could return an error, preventing database 1120 from spending processing time performing a database command that would ultimately return zero results. The inventive subject matter modifies and retrofits database memory of the existing computer system in software schematic 1110 to be accessed faster and more efficiently.

Further, in some embodiments, renovation module 1160 will improve cross-reference searches because it stores database memory from multiple searchable computer systems, collectively comprising searchable database 1120. Employing current cross-reference search methods entails individually searching each computer system that comprises searchable database 1120, and then displaying the results on administrative user interface 1110. Whereas the inventive subject matter, in some embodiments, performs a cross-reference search by only searching renovation module 1160 and displaying the results on administrative user interface 1130, thereby performing a cross-reference search faster and more efficiently than existing search methods.

The invention provides a substantial improvement over existing database searching technology. Currently, embodiments of the invention permit rapidly accessing memory at an average latency of 272 micro-seconds, while other existing database searching methods, for example Google's™ current "LevelDB" have an average latency of 11,067 micro-seconds. Thus, the invention performs up to 40 times faster than many existing database searching methods. Further, the invention possesses the capability to perform an average of 295,325 operations per second, whereas other existing database searching methods, like Google's™ "LevelDB", have the capacity to perform on average only 9,021 operations per second. This improvement of speed is accomplished by performing mathematical operations to traverse memory. Instead of using pointers, hash tables, or other indirect memory lookup processes, the invention transforms and reduces data into dynamic arrays that encompass a searchable tree structure, thereby allowing a user to access memory faster and more efficiently.

The inventive subject matter improves the functioning of any database computer system by tying a rapid search method to the processor's ability to rapidly traverse a data structure to search for values using mathematical operations instead of time-consuming memory lookup functions. Existing database search methods employ the use of pointers, hashtables, and other indirect memory processes which require greater amounts of memory and therefore take significantly longer to traverse. The inventive database system discloses new database construction and search techniques that are non-routine or conventional because it uses directly indexed arrays traversable using simple multiplicative and addition functionality. Existing conventional database search methods employ complicated and elongated processes that consume large amounts of memory by carrying out a multitude of indirect processes that cross-reference multiple values. Whereas the invention remedies these inefficiencies by abridging the entire database into a directly accessible k-ary tree structure that is quickly searched using just multiplicative and additive commands, thereby circumventing intermediary steps and accelerating the process.

By creating dynamic arrays using a k-ary tree structure, the invention's database is smaller than existing database searching methods. In turn, having a smaller database allows database searches to be performed substantially faster. Many modern processors have hardware support and rapid instructions for computing the number of antecedent bits in memory words, and performing simple mathematical tasks such as addition, subtraction, multiplication, and division much more rapidly than by accessing memory locations. Further, the invention is less expensive than existing database searching methods because the invention stores smaller data structures to search that require less memory.

Ultimately, the invention improves computer functionality and provides a reduced cost to users.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-implemented method, comprising:

receiving a searchable ternary tree comprising the set of values, wherein each node of the ternary tree structure consists of branches of the node and a character of at least one of the set of values, where the searchable ternary tree is traversable by comparing a search character against a node character and:

(a) following a left branch when the search character is less than the node character, (b) following a right branch when the search character is greater than the node character, and (c) following a center branch when the search character is equal to the node character;

converting, with the processor, the searchable ternary tree into a searchable array structure comprising a first array and a second array, wherein the first array comprises an array of bits derived from branches of each node of the ternary tree and the second array comprises an array of characters corresponding with the array of bits of the first array, wherein the array of branch values and the array of characters are inserted according to a breadth first search algorithm storing the searchable array structure in a memory location; and searching for a string in the searchable array structure by recursively performing the following steps:

(a) comparing a first character of the string against a first test character of the second array to arrive at a first comparison of greater, less than, or equal to the first character;

(b) selecting a bit of the corresponding branch as a function of the comparison; and (c) locating a second test character of the second array as a function of the product of 3 and a number of antecedent set bits to the corresponding selected bit.

2. The computer-implemented method of claim 1, wherein the characters comprise an alphanumeric character.

3. The computer-implemented method of claim 1, wherein the characters comprise a hexadecimal character.

4. The computer-implemented method of claim 1, further comprising compressing the searchable array structure before storing the searchable array structure in the memory location.

5. The computer-implemented method of claim 1, wherein the step of generating the searchable ternary tree comprises setting a bit of a branch when the branch is built from an existing node to a new node.

6. The computer-implemented method of claim 1, wherein the memory location comprises RAM memory.

7. The computer-implemented method of claim 1, further comprising displaying the search result to a user interface.

8. The computer-implemented method of claim 1, further comprising:

receiving the string from an existing user interface; and sending the search result to the existing user interface, wherein the step of receiving the set of values comprises importing the set of values from an existing database structure.

9. The computer-implemented method of claim 8, wherein the step of importing the set of values from the existing database structure comprises importing a key field and a value field from the existing database structure.

10. The computer-implemented method of claim 8, wherein the existing database structure comprises at least one of a DBMS structure, a file system, a NAS device, and a hash table.

11. A computer-implemented method, comprising:

receiving a set of values and storing the set of values in a first memory location;

generating, with a processor, a searchable ternary tree comprising the set of values, wherein each node of the ternary tree structure consists of branches of the node and a character of at least one of the set of values, wherein the first value of the set of values is inserted as a straight linear branch of characters from a root of the ternary tree, and wherein the second value of the set of values is inserted by comparing consecutive characters of the second value against consecutive characters of the straight linear branch and by branching off the straight linear branch where a character of the second value diverges from the straight linear branch;

converting, with the processor, the searchable ternary tree into a searchable array structure comprising a first array and a second array, wherein the first array comprises an array of bits derived from branches of each node of the ternary tree and the second array comprises an array of characters corresponding with the array of bits of the first array, wherein the array of branch values and the array of characters are inserted according to a breadth first search algorithm, storing the searchable array structure in a memory location; and searching for a string in the searchable array structure by recursively performing the following steps:

(a) comparing a first character of the string against a first test character of the second array to arrive at a first comparison of greater, less than, or equal to the first character;

(b) selecting a bit of the corresponding branch as a function of the comparison; and (c) locating a second test character of the second array as a function of a product of 3 and a number of antecedent set bits to the corresponding selected bit.

12. The computer-implemented method of claim 11, wherein the characters comprise an alphanumeric character.

13. The computer-implemented method of claim 11, wherein the characters comprise a hexadecimal character.

14. The computer-implemented method of claim 11, further comprising compressing the searchable array structure before storing the searchable array structure in the memory location.

15. The computer-implemented method of claim 11, wherein the step of generating the searchable ternary tree comprises setting a bit of a branch when the branch is built from an existing node to a new node.

16. The computer-implemented method of claim 11, wherein the memory location comprises RAM memory.

17. The computer-implemented method of claim 11, further comprising displaying the search result to a user interface.

18. The computer-implemented method of claim 11, further comprising:

receiving the string from an existing user interface; and sending the search result to the existing user interface, wherein the step of receiving the set of values comprises importing the set of values from an existing database structure.

19. The computer-implemented method of claim 18, wherein the step of importing the set of values from the existing database structure comprises importing a key field and a value field from the existing database structure.

20. The computer-implemented method of claim 18, wherein the existing database structure comprises at least one of a DBMS structure, a file system, a NAS device, and a hash table.

* * * * *